May 8, 1951  R. T. TRIER ET AL  2,551,914
COIN REGISTER PARKING METER
Filed Sept. 10, 1949  3 Sheets-Sheet 1

INVENTORS
Raymond T. Trier
Paul C. Janson and
Robert D. Murphy
BY Frease and Bishop
ATTORNEYS

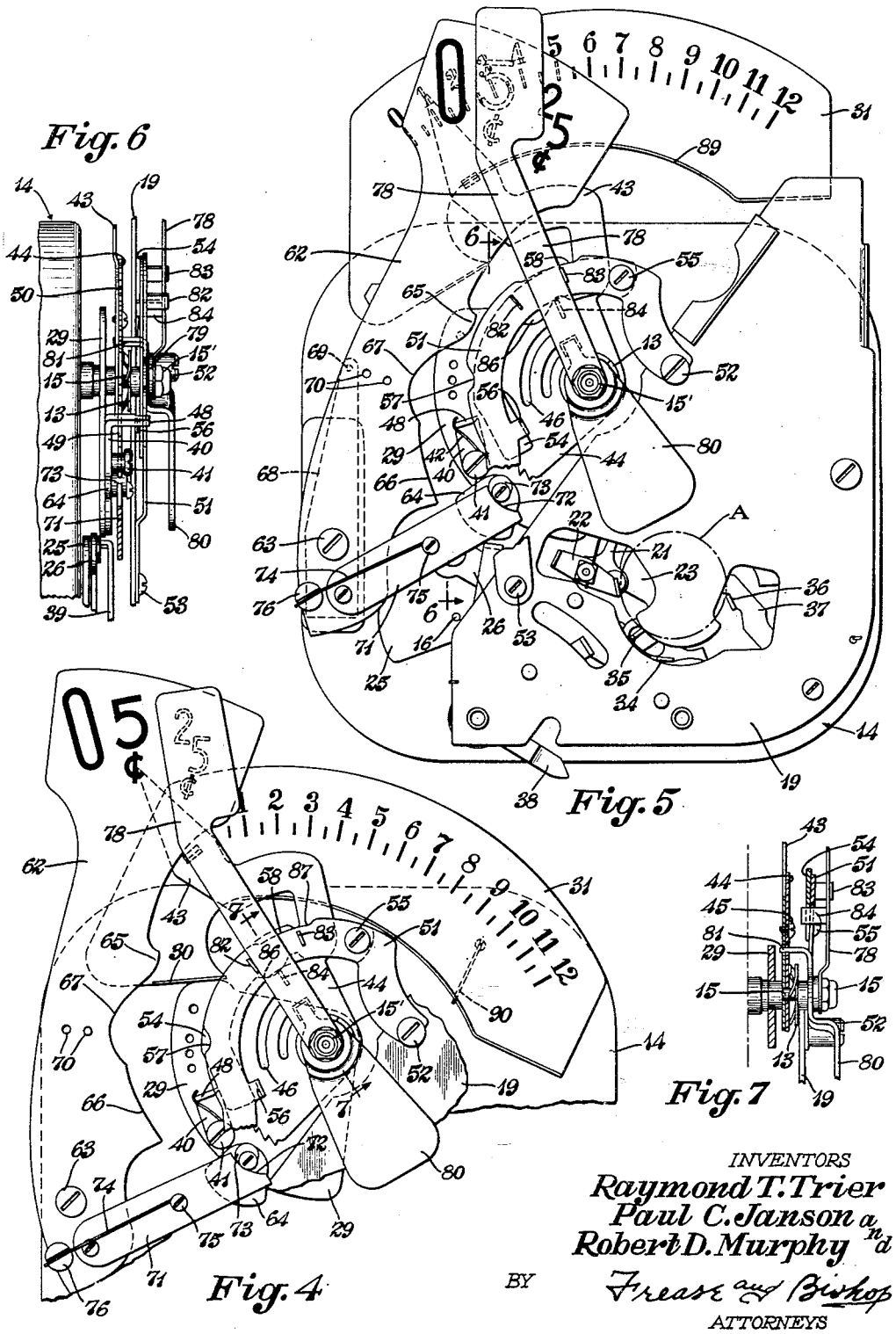

May 8, 1951  R. T. TRIER ET AL  2,551,914
COIN REGISTER PARKING METER
Filed Sept. 10, 1949  3 Sheets-Sheet 3

INVENTORS
Raymond T. Trier
Paul C. Janson and
Robert D. Murphy
BY Frease and Bishop
ATTORNEYS Patented May 8, 1951

2,551,914

UNITED STATES PATENT OFFICE 2,551,914

COIN REGISTER PARKING METER

Raymond T. Trier, North Canton, Paul C. Janson, Navarre, and Robert D. Murphy, Canton, Ohio, assignors to The Superior Switchboard & Devices Company, Canton, Ohio, a corporation of Ohio Application September 10, 1949, Serial No. 115,084

20 Claims. (Cl. 194—45)

The invention relates generally to coin-operated parking meters having a resetting mechanism of the type shown in the McGay Patent No. 2,284,221, and in our co-pending application, Serial No. 111,648, filed August 22, 1949, and entitled Time Selecting and Coin Handling Mechanism. More particularly, the invention relates to a parking meter suitable for use on parking lots where cars may be parked for one or a number of hours.

In parking lots it is desirable to charge a premium price for the first hour, and parking lot meters should therefore embody this feature. However, if the premium coin has been inserted by a first parker and there is unexpired time showing on the meter dial, the second parker will use the unexpired time, and if he desires additional time, will insert additional coins of lesser value without first inserting a premium coin.

It has been proposed to provide a meter for this purpose in which the dial or time scale is always hidden so that the person using the meter cannot know how much unexpired time is still on the meter, and will therefore first insert a premium coin and then additional coins of lesser value if he desires additional time.

This proposed meter is objectionable because the person using the meter has no way of knowing whether he is receiving credit for coins deposited, because the meter may be inoperative while still accepting coins. Another objection is that there is always an appeal to the average person's gambling instinct to take a chance that there is unexpired (though concealed) time on the meter, especially if he intends to park for a short time only, and to therefore deposit a coin or coins for additional time without first depositing a premium coin.

It is a general object of the present invention to provide a novel parking meter which is suitable for use as a parking lot meter.

Another and more specific object is to provide a novel parking meter which registers visibly the value of the coin deposited.

Another object is to provide a novel parking meter which accumulates a selected time interval for the first premium coin, and additional intervals for each coin of a selected smaller denomination, or a proportionate number of additional intervals for a coin of larger denomination, after the premium coin has been first deposited.

A further object is to provide a novel parking meter which visibly registers the value of a premium coin and additional coins, and which momentarily visibly registers "0" after the deposit of each additional coin and before registering the value of such coin.

Another object is to provide a novel parking meter having novel means for preventing anyone from obtaining any time by depositing a coin or coins of lesser value than a premium coin, if a predetermined time interval has elapsed following the deposit of the last coin.

A still further object is to provide a novel parking lot meter which overcomes the disadvantages of prior constructions, and which is adapted to embody substantially the same resetting mechanism as in other parking meters of the type shown in said McGay patent.

These and other objects are accomplished by the parts, constructions, arrangements and combinations which comprise the present invention, the nature of which is set forth in the following general statement, and a preferred embodiment of which is set forth in the following description and illustrated in the accompanying drawings as exemplifying the best known mode of carrying out the invention, and which is particularly and distinctly pointed out and set forth in the appended claims forming part hereof.

In general terms, the parking meter comprising the present invention may be stated as including a coin register arm actuated by a cam arm mounted on the usual flag cam plate of the resetting mechanism, to show through a window in the meter housing coin values marked on the register arm corresponding to coins deposited, the usual time scale being covered by said housing, there being a curtain arm which is moved by the indicator shaft to uncover the coin value when a coin is deposited and to cover said window when a certain time interval elapses after the last coin is deposited, and said window-covering movement of the curtain arm being arranged to move an adjustable cam slide into operative position for preventing the ratchet pawl on the flag cam from driving the indicator shaft to accumulate time on the meter, for any coin deposited except a premium coin.

Fig. 4 is a fragmentary view similar to Fig. 1, showing the position of the parts when the first premium hour has expired, with the time scale and indicator in the off position;

Fig. 5 is a front elevation with a second 25¢ coin supported on the rocker arm in front of the guide plate, showing the position of the coin register when the resetting mechanism starts through its second cycle immediately after its operation by the premium 25¢ coin;

Fig. 6 is a vertical fragmentary sectional view substantially on line 6—6, Fig. 5;

Fig. 7 is a fragmentary sectional view as on line 7—7, Fig. 4;

Figure 1:
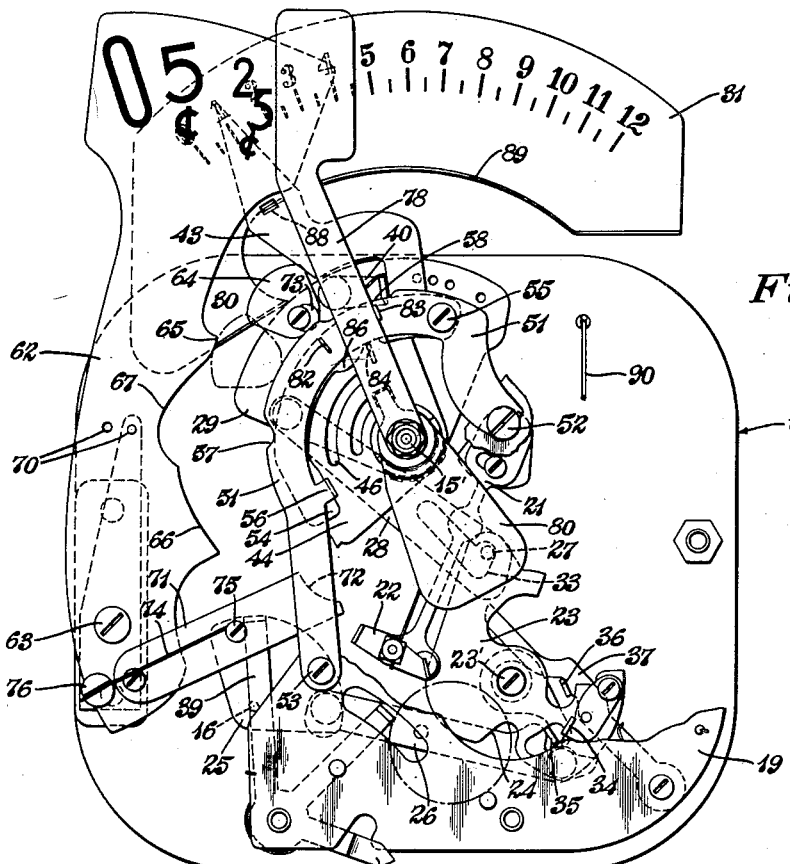
Figure 1 is a front elevation of the improved parking meter mechanism with the coin cap plate removed and the coin guide plate broken away to show the resetting mechanism, the parts being in the position of being operated by a premium 25¢ coin.

In the embodiment of the novel parking meter shown and described herein by way of example, the meter is designed to operate with a 25¢ coin as a premium coin and with a nickel coin or coins to obtain additional time after the premium coin has been deposited. However, it will be understood that within the scope of this invention, the parking meter can be made to operate with a coin of different denomination as the premium coin and with nickel coins or other coins of lesser denomination as the coins for obtaining additional time. Moreover, while the preferred embodiment of parking meters disclosed herein is designed to accumulate one hour for the premium coin and additional one-hour intervals for nickel coins deposited immediately or soon after the premium 25¢ coin, it will be understood that within the scope of the invention the meter could be designed so that the premium coin would register two or more hours, and the additional coins would register time intervals greater or less than one hour, as desired.

In the drawings, the sheet metal case indicated generally at 14 houses a suitable clockwork mechanism for driving the resetting mechanism and for driving the indicator shaft 15 counterclockwise, in the same manner as in the McGay Patent No. 2,284,221, and as in our aforesaid co-pending application, Serial No. 111,648. A nut 15' is screwed on the outer end of the indicator shaft for securing the indicator assembly thereon with a frictional engagement by means of a dished washer 13 which is clamped between a shoulder on shaft 15 and the ratchet plate. This allows the indicator assembly to be turned clockwise on the indicator shaft 15 while the shaft is turning in the opposite direction or is stationary.

As in the McGay patent and our co-pending application, the clockwork is operatively connected to a shaft 16 which drives the resetting mechanism through a cycle during one rotation of the shaft each time the clockwork is tripped by the insertion of a coin into the meter. The coin drops from the coin-receiving slot 17 (Fig. 2) of the meter housing indicated generally at 18 into a slot or guideway formed between the rear coin guide plate 19 and a front coin cap plate (not shown), the guide plates being mounted on the case 14 in spaced relation thereto.

The clockwork mechanism is controlled by a suitable brake (not shown) actuated by a trip shaft extending forwardly through the case 14 and having a trip lever 21 secured at its upper end thereon for rotating the shaft to release the brake and start the clockwork to drive the shaft 16 and actuate the resetting mechanism. The trip lever extends downwardly in front of the coin guide plate 19 in a position to be actuated by a 25¢ coin dropping between the coin guide plates and coming to rest momentarily in the position shown in dot-dash lines at A in Fig. 5, and also by a nickel coin coming to rest in the position B shown in Fig. 8. When a coin drops between the plates and engages the arm 22 on the bottom end of the trip lever 21, the coin pushes the lever laterally and rotates the trip shaft to release the brake and allow the clockwork to start rotating the drive shaft 16 of the resetting mechanism.

As explained in said McGay patent and in our co-pending application, a stop pin extends rearwardly from the lower end of the trip lever 21 and rides the edge of the release cam plate 23 of the resetting mechanism during its cycle, and when the shaft 16 has completed one revolution, the stop pin on the trip lever enters a notch 24 in the release cam which allows the trip lever 21 to return to its original position and stops the resetting mechanism.

The drive shaft 16 has secured thereon a sector plate 25 which has a pitman link 26 pivotally connecting the sector plate to the lower end of the release cam 23, and the upper end of the release cam is connected by a pin 27 to a slotted time selector link 28, which is pivoted at its upper end to a preferably quadrant-shaped flag cam plate 29 rotatable on the indicator shaft. Thus, as the shaft 16 rotates in a clockwise direction, it will oscillate the flag cam plate 29 first in a clockwise direction, and then in a counter-clockwise direction on the return stroke of the pitman link. The arcuate outer edge of the cam plate 29 acts as a cam in engaging the flange 30 of a dial or time scale bracket 31, as shown in Figs. 1 and 8, to raise the time scale as the indicator is advanced during the forward stroke of the resetting mechanism, the time scale being held in raised position by the indicator in its advanced position while the flag cam 29 is returned to starting position and while the indicator is being returned in the measured time interval by the clockwork.

The time selector link 28 is normally urged downwardly by a suitable spring so that the pin 27 on the release cam 23 is located in the offset portion of the slot 33 in link 28, and with the pin in this position, the flag cam 29 is given its full stroke during one cycle of the resetting mechanism. This full stroke is utilized when a coin of larger value (in this case a 25¢ coin) is deposited and lodges momentarily at the position A in Fig. 5. When a coin of smaller value (in this case a nickel coin) is deposited, the slotted link 28 provides a lost-motion connection in the resetting mechanism to give the flag cam 29 a short stroke, and this is accomplished in the same way that the shorter stroke for a penny is obtained in the McGay patent and in our co-pending application.

Figure 8:
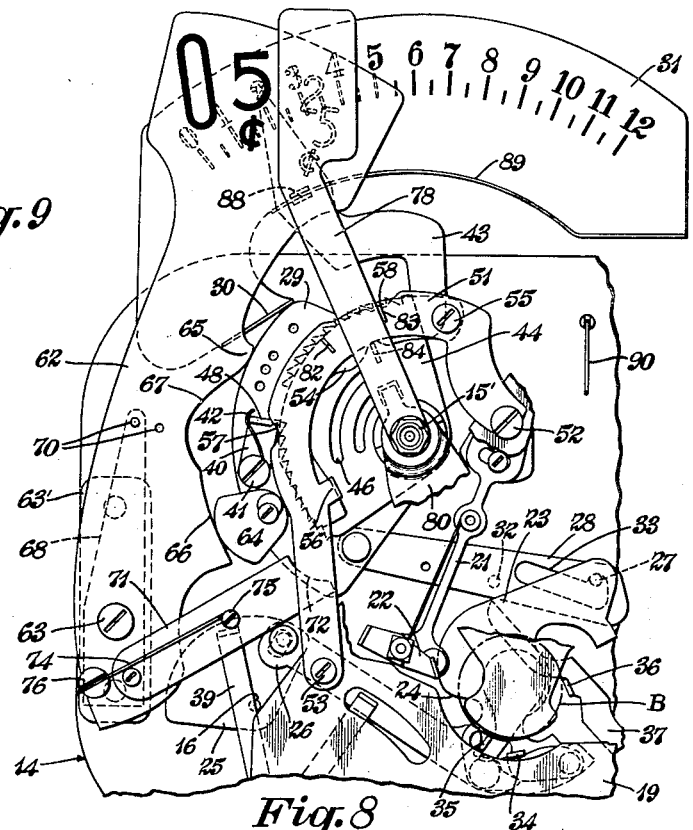
Fig. 8 is a fragmentary elevation similar to Fig. 1, with a nickel coin supported on the rocker arm, showing the position of the parts when the resetting mechanism is being operated by a nickel deposited immediately or soon after the premium 25¢ coin.

Briefly, when a nickel coin drops to the dot-dash position B in Fig. 8, it first rests on the rocker arm 34 carried on the release cam 23 and between a lever arm 35 actuated by the pitman link 26 and an arm 36 on a lift lever 37 which at its upper end is adapted to engage a pin 32 on the lower end of the time selector link 28 and raise the link. As the lever 35 is rotated counterclockwise on its pivot 23' by the resetting mechanism, the lever 35 reaches a point diametrically opposite the lever 36 so that the nickel coin B is pinched between the two levers and lifts the lift lever 37, which in turn lifts the link 28 and allows the pin 27 to drop in the elongated part of slot 33, thus providing a lost-motion period while the pin is traveling to the upper end of the slot, during which time the flag cam is momentarily stationary.

In the present meter, the distance between the lever arms 35 and 36 is such that they are always below center of a 25¢ coin A (Fig. 5), and never become diametrically opposite with respect to such coin, so that no lifting action is exerted through the coin on the lift lever arm 36, and the resetting mechanism goes through its full stroke. With a nickel coin, the coin first drops slightly below center with respect to the arms 35 and 36, and is supported by the rocker arm 34 until after the lever arm 35 has rotated downwardly and the coin has been pinched to lift the lever arm 36, and the lever arm 35 on the forward stroke then rotates under the coin B until the coin rolls off and drops down below the same.

The operation of the coin release lever is fully described in our co-pending application, and the lever includes an arm 39 on which a coin dropping off the lever arm 35 is temporarily supported to be viewed through the usual observation window until another coin is deposited, the release lever being actuated by a lever arm 39 which is engaged by the sector plate 25.

The oscillatable flag cam plate 29 is journaled on the indicator shaft 15 for advancing the indicator when the cam plate is rotated clockwise by the selector link 28 of the resetting mechanism. A ratchet pawl 40 is pivoted on the outer edge of the plate 29 by a screw 41 and urged radially inward by a torsion spring 42, and the pawl provides a selective driving connection between plate 29 acting as the driving member of the resetting mechanism, and the indicator or time-accumulator assembly, to advance the indicator hand 43 across the time scale 31 and accumulate time on the meter. The indicator hand 43 is secured to a ratchet plate 44, and is preferably adjustably secured thereto by means of a screw 45 extending through an arcuate slot 46 in the ratchet plate. The purpose of the adjustment is to obtain an accurate setting of the indicator hand with respect to the time scale, and to adjust the indicator for registering different time intervals for special meters.

Figure 3:
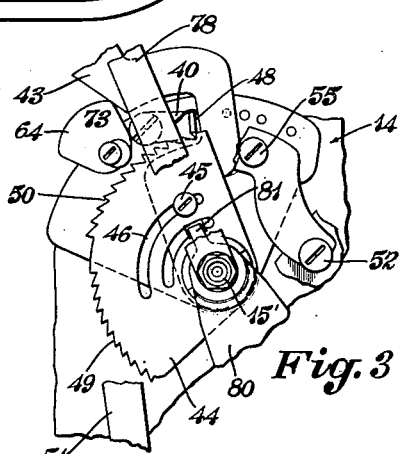
Fig. 3 is a fragmentary view similar to Fig. 1, with the cam slides broken away to show the ratchet cam.

The ratchet plate 44 has a series of teeth at its outer edge adapted to cooperate with the angular leg 48 of the ratchet pawl 40 to advance the indicator hand across the time scale so as to register accumulated one-hour intervals as coins are deposited in the meter. Referring to Fig. 3, the ratchet plate 44 has a lower series of teeth 49 and an upper series of teeth 50, and these teeth are selectively engaged by the ratchet pawl 40 as guided or controlled by a front fixed arcuate cam slide or guide 51 secured on the rear coin plate by screws 52 and 53 and a rear adjustable coin slide or guide 54 pivoted on the slide 51 by a screw 55.

Figure 11:
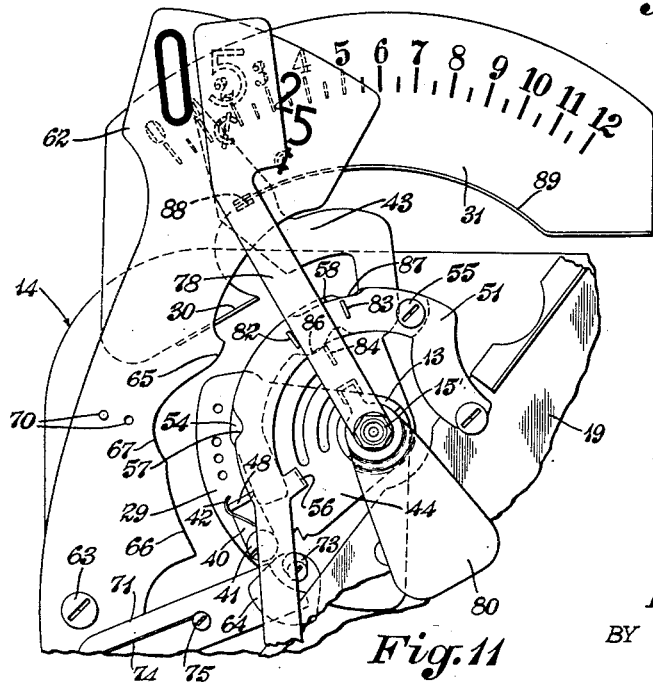
Fig. 11 is a fragmentary elevation similar to Fig. 8, showing the position of the parts after an hour has expired following deposit of a nickel immediately after the premium 25¢.
Figure 10:
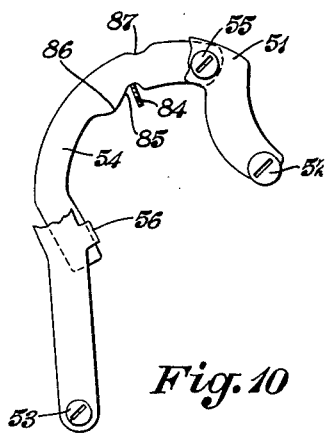
Fig. 10 is a fragmentary front elevation of the cam slides with the top fixed slide broken away to show the adjustable slide engaged by a finger on the curtain arm.

The adjustable guide 54 is movable between its inoperative position shown in Figs. 1 and 10 where the lower end of the guide engages a stop flange 56 on the fixed guide 51, and an operative position shown in Figs. 4 and 11 where the guide 54 is held out so that its edge is engaged by the pawl 40.

When the guide 54 is in its inoperative position as shown in Fig. 1, as the flag cam 29 moves clockwise, the ratchet pawl 40 first drops into the lower notch 57 of guide 51 and engages one of the teeth 49 long enough to advance the indicator hand 43 a distance of one hour on the time scale 31, at which time the pawl is kicked out by the upper edge of the notch. As the pawl continues to advance, if the rear guide 54 is still inoperative, the pawl drops into the upper elongated notch 58 in the fixed guide 51, and this notch is of such length as to advance the indicator over a time interval of four hours on the time scale, so that for a full stroke of the flage cam 29 the indicator advances a total of five hours.

With the adjustable guide 54 in inoperative position, if the flag cam 29 is moved through the short stroke by the deposit of a nickel coin, the pawl 40 will drop into the notch 57 and engage the ratchet plate 44 long enough to advance the indicator one hour on the time scale, but due to the short stroke of the flag cam, the pawl 40 returns before reaching the upper notch of the cam guide 51.

Figure 2:
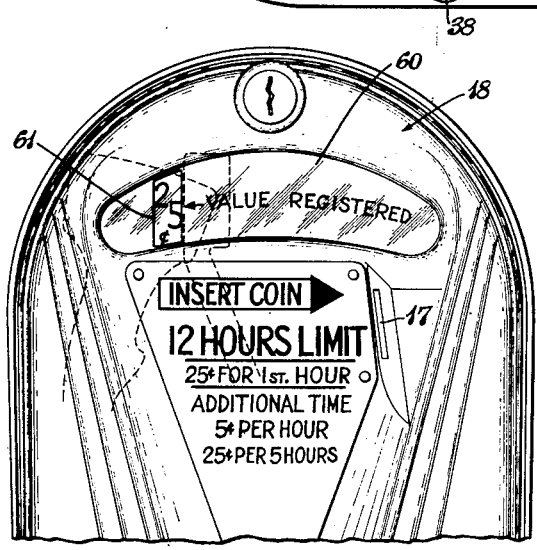
Fig. 2 is a fragmentary exterior elevation of the meter housing with the 25¢ designation on the coin register in the position of Fig. 1 visible through the window in the housing.

Referring to Fig. 2, the meter housing 18 is very similar to the housing for a conventional parking meter, except that the glass 60 through which the time scale is ordinarily visible is made opaque so as to cover the time scale, and is provided with a narrow window 61 which is adapted to show or register only the value of the coin deposited. In Fig. 2, a 25¢ designation is visible through the window 61 to show that a 25¢ coin has been the last coin deposited.

The means for registering the value of the coin at the window 61 preferably includes a coin register arm 62 which has marked thereon at three arcuately spaced locations the values 25¢, 5¢, and 0. The coin register arm preferably is pivoted at its lower end portion by a screw 63 on a bracket 63' which is secured on the case 14. The upper end of the arm on which the coin values are marked is adapted to swing in front of the left end of the time scale 31. The inner edge of the register arm 62 preferably is formed to constitute a cam surface which is engaged by a cam arm 64 secured on the flag cam 29 immediately below the ratchet pawl 40, so that rotation of the cam arm 64 in a clockwise direction by the flag cam 29 will actuate the register arm in a counterclockwise direction about its pivot 63.

The cam surface of the register arm includes a top projection 65 which is engaged by the cam arm during the long stroke of the flag cam, in the manner indicated in dot-dash lines in Fig. 1, and swings the arm 62 to the register or make visible at window 61 the 25¢ designation on the register arm, as indicated in Figs. 1 and 2. The cam surface of register arm 61 also has a lower projecting portion 66 which is first engaged by the cam arm 64 during the advance stroke of the flag cam 29 to move the register arm to the position shown in Fig. 8 and register the 5¢ designation in the window 61. If the flag cam 29 is advanced only through the short stroke, the cam arm 64 does not go above the recessed portion 67 of the cam surface, and hence does not engage the upper cam projection 65.

A spring retainer arm 68 is secured to the case 14, preferably to the bracket 63' by screw 68', and the upper end of the arm has a projection 69 which is adapted to yieldingly engage selectively in holes or indentations 70 in the register arm 62, one of the holes being engaged when the register arm is in the position of Fig. 1 showing the 25¢ designation, and the other hole being engaged by the spring arm when the register arm is in the position of Fig. 8 to show the 5¢ designation.

Below the pivot screw 63 of the register arm, a link 71 may be attached at one end to the arm, and the other end of the link has an arcuate cam surface 72 which is adapted to engage an eccentric 73 secured on top of the cam arm 64. The link 71 is yieldingly held upwardly by means of a flat spring 74 connected to a screw 75 on the link and to a slotted adjusting stud 76 on the register arm 61. Referring to Fig. 5, when a coin is deposited and the resetting mechanism is actuated, at the start of the stroke of the flag cam 29 the eccentric 73 rides along the cam end 72 of the link 71 and rotates the register arm 62 clockwise to bring the 0 designation momentarily into view in the window 61. As the flag cam advances, the eccentric slides off the end of the link and the cam arm 64 then engages the cam surface 66 of the register arm to swing it counterclockwise as previously described. The purpose of momentarily making the 0 designation visible through the window is to inform the person depositing a coin that the meter is working and he is getting credit for the coins he is depositing. If the meter did not show any change in the designation, as when several nickel coins are deposited, then there would be no indication that the meter was working.

Figure 9:
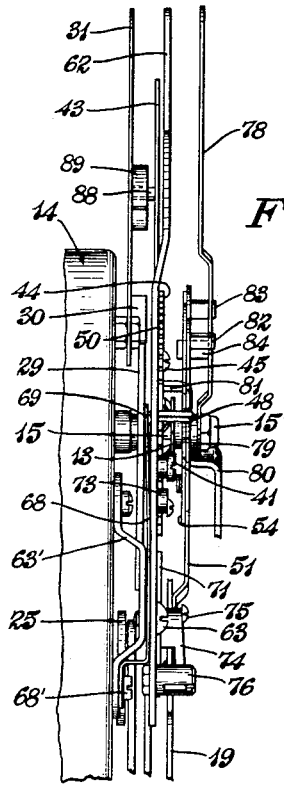
Fig. 9 is a side elevation thereof.

The means for concealing the register arm and preventing a person from obtaining any time on the meter without depositing a premium coin, after an hour has elapsed following the deposit of the last coin, will now be described. A curtain arm 78 is mounted on the indicator shaft 15 under the nut 15′, and a washer 79 (Fig. 9) of semi-resilient material is preferably located between the bottom end of the curtain arm 78 and the counterweight plate 80 which is connected to the indicator hand 43 by the angular arm 81 on plate 80 extending into a slot in the indicator 43. The washer 79 is of such character as to provide a frictional connection between curtain arm 78 and the indicator hand 43 so that when the indicator is advanced the curtain arm will tend to rotate clockwise, and when the indicator is returned by the clockword, the curtain arm will tend to turn counterclockwise.

The movement of the curtain arm 78 is limited by two stops 82 and 83 projecting outwardly from the fixed cam guide 51, one on each side of the curtain arm, so that as the ratchet plate 44 advances and carries with it the curtain arm, when the curtain arm strikes the stop 83 on the right side thereof the movement of the curtain arm will be stopped and the frictional connection will allow the indicator to advance, and when the indicator is returned by the clockwork, during the first part of the return movement of the indicator the frictional connection between the curtain arm and indicator will rotate the curtain arm until it strikes the left stop 82, after which the frictional connection will allow return movement of the indicator to continue.

The distance between the stops 82 and 83 is such that when the indicator is returning the curtain arm will move from the right stop to the left stop during a one-hour interval, and thus conceal the designation on the register arm which is visible in the window 61. On the advance stroke, when the indicator advances over a one-hour interval, the curtain arm will advance from the left arm to the right arm a sufficient distance to uncover the designation which is positioned in the window.

The curtain arm 78 is provided with a rearwardly projecting tongue 84 which is adapted to move the adjustable cam guide 54 between its operative and inoperative positions. As best shown in Figs. 7 and 10, the tongue 84 engages and slides along the inner edge of the cam guide 54 and when the tongue enters the notch 85 in the slide, the slide rotates downwardly by gravity on its pivot 55 until its lower end engages the stop flange 56 on the fixed slide. In this position the guide 54 is in its inoperative position shown in Figs. 1, 5, 8 and 10.

When the tongue 84 engages the rounded projection 86 on the guide 54, as in Figs. 4 and 11, the guide is in operative position and its outer cam edge is in position to guide the ratchet pawl 40 instead of the pawl being guided by the outer edge of fixed guide 51. The outer edge of guide 54 has only one notch 87 which registers with the end portion of the four-hour notch 58 on fixed guide 51, the notch 87 being of such length as to allow the ratchet pawl to engage the ratchet plate 44 long enough to register one hour on the time scale 31.

Now, assuming that the meter previously has been operated to accumulate line, and the clockwork is returning the indicator at a measured rate and with it the frictionally-connected curtain arm 78, during substantially one hour of the returning movement of the indicator the curtain arm will move from stop 83 to stop 82 and cover window 61 while the tongue 84 will engage projection 86 and force the slide 54 outwardly to its operative position of Figs. 4 and 11. In this position the one-hour notch 57 of the fixed guide is covered or rendered inoperative by the movable guide 54, and all but the last-hour portion of the notch 58 of the fixed guide is also covered. Accordingly, if a coin is inserted the ratchet pawl will pass by the notch 57 without operating the ratchet plate 44 and without accumulating any time on the meter.

If the one-hour return movement of the indicator has been from the one-hour position of Fig. 1, then the tongue 88 on the indicator hand (Fig. 9) which supports the time scale will have passed by the left end of the flange 89 thereon, allowing the time scale to drop to the position of Fig. 4 and engage an arm 90 which stops the clockwork. In this position of the meter, the insertion of one or more nickel coins will not accumulate any time because the ratchet pawl 40 will be operated through its short stroke and will pass the notch 57 but will return before reaching the notch 87, so that the ratchet plate 44 will not be operated. Thus, a person wishing to operate the meter to obtain parking time, will look at the window 61 and see the window covered by the top portion of the curtain arm 78, indicating that a premium coin will be required to start the meter to operate. Even if the person should deposit a nickel coin, the curtain arm will stay in position covering the window, and no time will be accumulated on the meter.

If now a 25¢ coin is deposited, when the ratchet pawl 40 moves through its full stroke, it will not engage the ratchet plate until it drops into the notch 87 of the movable guide which is long enough to register one hour on the meter, and the register arm will be moved by the cam arm 64 to the position of Fig. 1 with the 25¢ designation showing in the window as in Fig. 2. Thus, the deposit of the first 25¢ premium coin will have accumulated one hour on the meter, and the curtain arm will have moved to the right to expose the 25¢ designation in the window 61.

If a nickel coin is now deposited at any time before one hour expires following the deposit of the 25¢ coin, the 0 designation will flash momentarily in the window 61 as previously described, and since the guide 54 has been moved to inoperative position by the curtain arm, the ratchet pawl will drop into the notch 57 and move the ratchet plate to advance the indicator 43 to the two-hour position shown in Fig. 8. During this movement the short stroke of the pawl will cause the cam arm 64 to engage the surface 66 of the register arm to move the 5¢ designation into the window, the cam arm 64 being returned before engaging the upper cam projection 65.

Additional nickel coins can be deposited to accumulate additional one-hour periods on the time scale, and at any time after the premium 25¢ coin has been deposited, the deposit of an additional 25¢ coin will advance the indicator to accumulate an additional five hours, one hour when the pawl drops into the notch 57 and four additional hours when the pawl drops into the notch 58. Of course, the total amount of time which can be accumulated on the present meter is twelve hours, as indicated on the time scale 31, so that if the total amount of money deposited pays for time greater than twelve hours, only twelve hours will be accumulated.

If a one-hour return movement of the indicator occurs from a two-hour or greater position, the curtain arm will move from stop 83 to stop 82 and cover window 61 and the guide 54 will be forced out to operative position, so that a nickel coin will not accumulate any time and a premium 25¢ will accumulate only one hour, regardless of unexpired time remaining on the meter.

As indicated in Fig. 3, the upper series of teeth 50 on the ratchet plate 44 are selectively engaged by the ratchet pawl as it drops into the upper notch 58 on the fixed guide or into the notch 87 on the movable guide. The lower series of teeth 49 are arranged to be engaged by the ratchet pawl when it drops into the notch 57 on the fixed guide 51. The teeth 49 and 50 are spaced in proportion to the arcuate length of the slots 57, 58 and 87, so that when one tooth is engaged and advanced by the pawl, another tooth will be positioned for engagement by the pawl on the next operation.

As far as the person operating the meter is concerned, the indicator 43 and time scale 31 are never visible, and these parts could be replaced by other time-accumulator means, but they are useful to indicate the accumulated time to an authorized person who may open the meter housing to check a meter which is stuck or is not operating properly, and in order to adjust and repair the meter. As indicated in Fig. 2, the exterior of the housing should contain suitable directions so that the person using the meter clearly understands that he is required to deposit the 25¢ premium coin for the first hour, and after that he may obtain additional time at the rate of 5¢ per hour or 25¢ for five hours. Thus, after the first premium 25¢ coin, a total of twelve hours may be accumulated by depositing eleven nickel coins, or an additional 25¢ coin and six nickel coins, or two additional 25¢ coins and one nickel coin.

The operation of the movable cam guide 54 by the curtain arm on its return movement makes it possible to require a premium coin for the first hour after an hour has elapsed following the last coin deposited, irrespective of the amount of time actually remaining on the meter. Thus, if the curtain arm has been returned to cover the window 61, no time can be accumulated on the meter by anyone depositing less than the required premium coin, because the movable cam slide has been moved into operative position, and a coin of lesser value will not advance the indicator. Accordingly, if a first parker has vacated the parking space and left unexpired time accumulated on the meter, if an hour has elapsed from the deposit of the last coin a second parker cannot obtain any paid-for time on the meter without first depositing the required premium coin, and will deposit additional coins for time desired in addition to one hour, because he has no means of knowing if there is any unexpired time on the meter.

The novel coin register meter comprising the present invention overcomes the disadvantages of prior proposed parking lot meters, and is adapted to embody substantially the same resetting mechanism as in present parking meters of the type shown in the McGay Patent No. 2,284,221, thereby reducing the manufacturing cost of the novel meter to a minimum.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

We claim:

1. In a parking meter having a coin-controlled resetting mechanism for advancing a time indicator, a movable coin register arm having coin value designations, a cam operated by said resetting mechanism for moving said register arm selectively to show said designations, and a curtain operated by said indicator for selectively covering and uncovering said designations.

2. In a parking meter having a coin-controlled resetting mechanism operatively connectible to a time indicator for advancing said time indicator, a movable coin register arm having coin value designations, a cam operated by said resetting mechanism for moving said register arm selectively to show said designations, a curtain operated by said indicator for selectively covering and uncovering said designations, and a guide operated by said curtain for controlling the operative connection between the resetting mechanism and the time indicator.

3. In a parking meter having a coin-controlled resetting mechanism operatively connectible to a time indicator for advancing said time indicator, a movable coin register arm having coin value designations, a cam operated by said resetting mechanism for moving said register arm selectively to show said designations, a curtain operated by said indicator for selectively covering and uncovering said designations, a fixed guide normally controlling the operative connection between the resetting mechanism and the time indicator, and a movable guide operated by said curtain for selectively controlling said operative connection.

4. In a parking meter having a coin-controlled resetting mechanism for advancing a time accumulator, a window, a movable register arm having coin value designations arranged to be visible selectively in said window, means operated by said resetting mechanism for positioning said designations selectively in said window, and a curtain operated by said time accumulator for uncovering said window when time is being accumulated and for covering said window when a predetermined interval of accumulated time has elapsed.

5. In a parking meter having a coin-controlled resetting mechanism operatively connectible to a time accumulator for advancing said time accumulator, a window, a movable register arm having coin value designations arranged to be visible selectively in said window, means operated by said resetting mechanism for positioning said designations selectively in said window, a curtain operated by said time accumulator for uncovering said window when time is being accumulated and for covering said window when a predetermined interval of accumulated time has elapsed, and guiding means operated by said curtain for controlling the operative connection between the resetting mechanism and the time accumulator.

6. In a parking meter having a coin-controlled resetting mechanism operatively connectible to a time accumulator for advancing said time accumulator, a window, a movable register arm having coin value designations arranged to be visible selectively in said window, means operated by said resetting mechanism for positioning said designations selectively in said window, a curtain operated by said time accumulator for uncovering said window when time is being accumulated and for covering said window when a predetermined interval of accumulated time has elapsed, a fixed guide normally controlling the operative connection between the resetting mechanism and the time accumulator, and a movable guide operated by said curtain for selectively controlling said operative connection.

7. In a parking meter having a coin-controlled resetting mechanism for advancing a time accumulator, a window, a movable register arm having a zero designation and coin value designations, means operated by said resetting mechanism during each operation for first positioning said zero designation momentarily in said window and then positioning selectively one of said coin value designations in said window, and a curtain operated by said time accumulator for uncovering said window as time is accumulated and for covering said window when a predetermined interval of accumulated time has elapsed.

8. In a parking meter having a coin-controlled resetting mechanism operatively connectible to a time accumulator for advancing said time accumulator, a window, a movable register arm having a zero designation and coin value designations, means operated by said resetting mechanism during each operation for first positioning said zero designation momentarily in said window and then positioning selectively one of said coin value designations in said window, a curtain operated by said time accumulator for uncovering said window as time is accumulated and for covering said window when a predetermined interval of accumulated time has elapsed, and guiding means operated by said curtain for controlling the operative connection between the resetting mechanism and the time accumulator.

9. In a parking meter having a coin-controlled resetting mechanism operatively connectible to a time accumulator for advancing said time accumulator, a window, a movable register arm having a zero designation and coin value designations, means operated by said resetting mechanism during each operation for first positioning said zero designation momentarily in said window and then positioning selectively one of said coin value designations in said window, a curtain operated by said time accumulator for uncovering said window as time is accumulated and for covering said window when a predetermined interval of accumulated time has elapsed, a fixed guide normally controlling the operative connection between the resetting mechanism and the time accumulator, and a movable guide operated by said curtain for selectively controlling said operative connection.

10. In a parking meter having coin-controlled resetting mechanism including an oscillatable plate operatively connectible with an indicator to accumulate time on the meter, a register arm movably mounted on the meter and having coin value designations, means on the oscillatable plate for moving said register arm selectively to position said designations to be visible exteriorly of said meter, and a curtain arm frictionally connected with said indicator for selectively covering said designations when in normally visible position.

11. In a parking meter having coin-controlled resetting mechanism including an oscillatable plate operatively connectible with an indicator to accumulate time on the meter, a register arm movably mounted on the meter and having coin value designations, means on the oscillatable plate for moving said register arm selectively to position said designations to be visible exteriorly of said meter, a curtain arm frictionally connected with said indicator for selectively covering said designations when in normally visible position, and guiding means operated by said curtain arm for controlling the operative connection between said oscillatable plate and said indicator.

12. In a parking meter having coin-controlled resetting mechanism including an oscillatable plate operatively connectible with an indicator to accumulate time on the meter, a register arm movably mounted on the meter and having coin value designations, means on the oscillatable plate for moving said register arm selectively to position said designations to be visible exteriorly of said meter, a curtain arm frictionally connected with said indicator for selectively covering said designations when in normally visible position, a fixed guide normally controlling the operative connection between said oscillatable plate and said indicator, and a movable guide operated by said curtain arm for selectively controlling said operative connection.

13. In a parking meter having coin-controlled mechanism for oscillating a driving member operatively connectible with an indicator to accumulate time on the meter, a register arm movably mounted on the meter and having a zero designation and coin value designations, means operated by the resetting mechanism during each operation for first positioning said zero designation to be visible momentarily exteriorly of said meter, means on said driving member for moving said register arm selectively to position said coin value designations to be visible subsequently during each resetting operation, and a curtain arm operated by said indicator for selectively covering said designations in normally visible position.

14. In a parking meter having coin-controlled mechanism for oscillating a driving member operatively connectible with an indicator to accumulate time on the meter, a register arm movably mounted on the meter and having a zero designation and coin value designations, means operated by the resetting mechanism during each operation for first positioning said zero designation to be visible momentarily exteriorly of said meter, means on the driving member for moving said register arm selectively to position said coin value designations to be visible subsequently during each resetting operation, a curtain arm operated by said indicator for selectively covering said designations in normally visible position, and guiding means operated by said curtain arm for controlling the operative connection between said driving member and said indicator.

15. In a parking meter having coin-controlled mechanism for oscillating a driving member operatively connectible with an indicator to accumulate time on the meter, a register arm movably mounted on the meter and having a zero designation and coin value designations, means operated by the resetting mechanism during each operation for first positioning said zero designation to be visible momentarily exteriorly of said meter, means on the driving member for moving said register arm selectively to position said coin value designations to be visible subsequently during each resetting operation, a curtain arm operated by said indicator for selectively covering said designations in normally visible position, a fixed guide normally controlling the operative connection between said driving member and said indicator, and a movable guide operated by said curtain arm for selectively controlling said operative connection.

16. In a parking meter having a coin-controlled resetting mechanism for advancing a time accumulator through a full stroke for a coin of larger value and through a short stroke for a coin of smaller value, a window, a movable register arm having designations corresponding to the values of said coins, means operated by the resetting mechanism to position said designations selectively in said window corresponding to the coin deposited, and a curtain operated by said time accumulator for uncovering said window as time is accumulated and for covering said window when a predetermined interval of accumulated time has elapsed.

17. In a parking meter having a coin-controlled resetting mechanism operatively connectible with a time accumulator for advancing said accumulator through a full stroke for a coin of larger value and through a short stroke for a coin of smaller value, a window, a movable register arm having designations corresponding to the values of said coins, means operated by the resetting mechanism to position said designations selectively in said window corresponding to the coin deposited, a curtain operated by said time accumulator for uncovering said window as time is accumulated and for covering said window when a predetermined interval of accumulated time has elapsed, and guiding means operated by said curtain for controlling the operative connection between the resetting mechanism and the accumulator.

18. In a parking meter having a coin-controlled resetting mechanism operatively connectible with a time accumulator for advancing said accumulator through a full stroke for a coin of larger value and through a short stroke for a coin of smaller value, a window, a movable register arm having designations corresponding to the values of said coins, means operated by the resetting mechanism to position said designations selectively in said window corresponding to the coin deposited, a curtain operated by said time accumulator for uncovering said window as time is accumulated, and for covering said window when a predetermined interval of accumulated time has elapsed, a fixed guide for controlling the operative connection between said resetting mechanism and said time accumulator to accumulate a short time interval for a short stroke and a longer time interval for a full stroke, and a movable guide operated by the window-covering movement of said curtain for controlling the said operative connection to accumulate a short time interval for a full stroke and no time for a short stroke.

19. In a parking meter having coin-controlled resetting mechanism including an oscillatable plate carrying a ratchet pawl operatively engageable with a ratchet plate time accumulator, a window, a register arm movably mounted on the meter and having coin value designations, cam means on said oscillatable plate for engaging said register arm selectively to position said designations in said window, a curtain arm frictionally connected with said ratchet plate for selectively uncovering said window when the ratchet plate is advanced and covering the window when the ratchet plate is returned a predetermined amount, and guiding means operated by the curtain arm for controlling the engagement between said ratchet pawl and ratchet plate.

20. In a parking meter having coin-controlled resetting mechanism operating an oscillatable plate selectively through a long and a short stroke by coins of different value, said plate carrying a ratchet pawl operatively engageable with a ratchet plate time accumulator, a window, a register arm movably mounted on the meter and having designations for said different value coins, cam means on said oscillatable plate for engaging said register arm selectively to position said designations in said window, a curtain arm frictionally connected with said ratchet plate for selectively uncovering said window when the ratchet plate advances and for covering the window when the ratchet plate is returned a predetermined amount by the meter clockwork, a fixed guide for engaging the ratchet pawl and ratchet plate to advance the plate a short interval for a short stroke of the pawl and a longer interval for a long stroke of the pawl, and a movable guide operated by the returning movement of said curtain arm for engaging the ratchet pawl to advance the ratchet plate only during a long stroke of the pawl and only over a short interval.

RAYMOND T. TRIER.
PAUL C. JANSON.
ROBERT D. MURPHY.

No references cited.